United States Patent
Chen et al.

(10) Patent No.: US 11,136,495 B2
(45) Date of Patent: Oct. 5, 2021

(54) PHOTOCHROMIC PT(II)-M(I) HETEROTRINUCLEAR COMPLEXES, PREPARATION METHOD THEREFOR AND USE THEREOF

(71) Applicant: FUJIAN INSTITUTE OF RESEARCH ON THE STRUCTURE OF MATTER, CHINESE ACADEMY OF SCIENCES, Fujian (CN)

(72) Inventors: Zhongning Chen, Fujian (CN); Xu Zhang, Fujian (CN); Jinyun Wang, Fujian (CN); Liyi Zhang, Fujian (CN)

(73) Assignee: FUJIAN INSTITUTE OF RESEARCH ON THE STRUCTURE OF MATTER, CHINESE ACADEMY OF SCIENCES, Fujian (CN)

( * ) Notice: Subject to any disclaimer, the term of this patent is extended or adjusted under 35 U.S.C. 154(b) by 0 days.

(21) Appl. No.: 16/813,360

(22) Filed: Mar. 9, 2020

(65) Prior Publication Data
US 2020/0283679 A1 Sep. 10, 2020

(30) Foreign Application Priority Data
Mar. 7, 2019 (CN) .......................... 201910172876.7

(51) Int. Cl.
*C09K 9/02* (2006.01)
*C07F 15/00* (2006.01)
*C09B 57/10* (2006.01)

(52) U.S. Cl.
CPC ............ *C09K 9/02* (2013.01); *C07F 15/0013* (2013.01); *C09B 57/10* (2013.01); *C09K 2211/1007* (2013.01); *C09K 2211/1014* (2013.01); *C09K 2211/185* (2013.01); *C09K 2211/188* (2013.01)

(58) Field of Classification Search
CPC .............................. C07F 15/0013; C09B 57/10
See application file for complete search history.

(56) References Cited

U.S. PATENT DOCUMENTS

2019/0319200 A1* 10/2019 Chen .................... C07F 15/0086
2020/0189309 A1* 6/2020 Chang .................. B42D 25/373

OTHER PUBLICATIONS

CAS Abstract and Indexed Compound, T. Tanase et al., 43 Chemistry Letters, 913-915 (2014) (Year: 2014).*
T. Tanase et al., 43 Chemistry Letters, 913-915 (2014) (Year: 2014).*
H. Xiao et al., 11 ACS Applied Materials & Interfaces, 45853-45861 (2019) (Year: 2019).*
Y. Li et al., 5 Journal of Materials Chemistry C, 3072-3078 (2017) (Year: 2017).*
Q. Zhang et al., 378 Coordination Chemistry Reviews, 121-133 (2019) (Year: 2019).*
L. Zhang et al., 52 Inorganic Chemistry, 5167-5175 (2013) (Year: 2013).*
X. Zeng et al., 4 Journal of Materials Chemistry C, 6096-6103 (2016) (Year: 2016).*
L. Zhang et al., 46 Dalton Transactions, 865-874 (2017) (Year: 2017).*
L. Xu et al., 25 Advanced Functional Materials, 3033-3042 (2015) (Year: 2015).*
X. Zhang et al., 8 Journal of Materials Chemistry C, 715-720 (2020) (Year: 2020).*
CAS Abstract US 2020/0283679 (2020) (Year: 2020).*

* cited by examiner

*Primary Examiner* — Alexander R Pagano
(74) *Attorney, Agent, or Firm* — Novick, Kim & Lee, PLLC; Allen Xue

(57) ABSTRACT

$Pt_2M$ heterotrinuclear metal-organic alkynyl complexes have a structure of formula (I): $[Pt_2M(\mu\text{-}PR_2CH_2PRCH_2PR_2)_2(C\equiv CR')_2(C\equiv CR'')_2]^+{}_m A^{m-}$. In formula (I), $\mu$ represents a bridging ligand; $PR_2CH_2PRCH_2PR_2$ is a type of tridentate phosphine ligands; the subscript number of each letter represents the number of each group. The complexes present phosphorescent emission, and the color distribution of the emitted light is relatively broad from blue-green to orange-red. The complexes can be used as photoluminescent materials in the fields of displays, lighting, sensors and biomarkers. Among the complexes, Cu complexes also exhibit reversible self-recovery photochromic performance. Under UV irradiation, the complexes change from a colorless or light color state to a dark color state rapidly, and after stopping UV irradiation, they gradually return to the light color state.

11 Claims, 2 Drawing Sheets

PHOTOCHROMIC PT(II)-M(I) HETEROTRINUCLEAR COMPLEXES, PREPARATION METHOD THEREFOR AND USE THEREOF

TECHNICAL FIELD

The invention belongs to the technical field of photochromic materials, and in particular relates to a class of $Pt_2M$ (M=Cu, Ag, Au) heterotrinuclear metal-organic alkynyl complexes, their preparation method and the use.

BACKGROUND ART

Photochromism refers to the change of color due to the change of electronic absorption peak upon irradiation of a substance at a certain wavelength light, which is generally reversible and results from the variation in molecular structure. Photochromic substances generally undergo reversible transformation between two stable or metastable states with different electronic absorption spectra. At least, the transformation in one direction must be triggered by light. Because of their different electronic and molecular structures, the two stable or metastable states often exhibit different colors and various physical properties such as optical, electrical and magnetic characteristics, etc. On the basis of different compositions and structures of photochromic substances, they can be divided into inorganic photochromic materials, organic photochromic materials and metal-organic photochromic materials.

Photochromic materials have extensive applications in the fields of trademark anti-counterfeiting, information encryption and decryption, decoration and protective packaging, optical information storage, optical control, optical switches, and optical devices etc. In particular, photochromic materials have been practically used in industries such as automobiles, cosmetics, clothing, handicrafts, glasses, etc. They also show attractive application prospects in many aspects such as high-density optical storage, ray detection, optical switches, optical brakes, liquid crystal morphology control, protein activity control, biological imaging and so on.

According to the current literature reports, photochromism requires that a substance reversibly transforms between two different stable or metastable states (state 1 and state 2) by means of two different kinds of external stimuli. Generally, irradiation of a substance under UV-vis light with various wavelengths and energies can achieve a reversible transformation between the two states. In some cases, a substance can transform from state 1 to state 2 with light irradiation, but state 2 must reverted back to state 1 only by heating or other external stimuli. To date, there are few reports on spontaneous recovery photochromism, that is, the use of single wavelength light as the only external stimulus can achieve the reversible conversion of photochromism between two different color states.

SUMMARY OF THE INVENTION

An object of the invention is to provide a class of $Pt_2M$ (M=Cu, Ag, Au) heterotrinuclear metal-organic alkynyl complexes, a preparation method therefor and the use thereof.

The object of the present invention can be realized by the following method: A class of $Pt_2M$ (M=Cu, Ag, Au) heterotrinuclear metal-organic alkynyl complexes, and the structure is shown in the following formula (I):

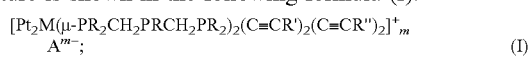

(I)

wherein, μ represents a bridging ligand; $PR_2CH_2PRCH_2PR_2$ is a type of tridentate phosphine ligand; the subscript number of each letter indicates the number of each group;

M is Au(I), Ag(I), or Cu(I);

R, R' and R" are identical or different, independently selected from groups of alkyl, alkenyl, alkynyl, aryl, or heteroaryl that are unsubstituted or optionally substituted by one, two or more $R^1$;

$R^1$ is selected from groups of alkyl, alkenyl, alkynyl, aryl, halogen (F, Cl, Br, I), trihalomethyl(—$CX_3$, X=F, Cl, Br), nitro (—$NO_2$), cyano (—CN), —$OR^3$, —$N(R^4)_2$, —CO—$R^5$, sulfo (—$SO_3H$), sulfonyl [—$S(=O)_2R^6$], sulfoxide [—S(=O)$R^6$], —P(=O)$(R^7)_2$, tertiary amine cation (—$N(R^8)_3^+$), or N-substituted pyridyl cation [—$C_5H_4N(R^9)^+$], which are unsubstituted or optionally substituted by one, two or more $R^2$;

$R^2$ is selected from groups of alkyl, alkenyl, alkynyl, aryl, halogen (F, Cl, Br, I), trihalomethyl(—$CX_3$, X=F, Cl, Br), nitro (—$NO_2$), cyano (—CN), —$OR^3$, —$N(R^4)_2$, —CO—$R^5$, sulfo (—$SO_3H$), sulfonyl [—$S(=O)_2R^6$], sulfoxide [—S(=O)$R^6$], —P(=O)$(R^7)_2$, tertiary amine cation (—$N(R^8)_3^+$), or N-substituted pyridyl cation [—$C_5H_4N(R^9)^+$];

$R^3$ is alkyl, aryl, or heteroaryl; $R^4$ is identical or different, independently selected from H, alkyl, aryl, or heteroaryl; $R^5$ is H, —OH, alkyl, aryl, or heteroaryl; $R^6$, $R^7$, $R^8$ and $R^9$ are alkyl, aryl, or heteroaryl;

$A^{m-}$ is a monovalent or bivalent anion, and m is 1 or 2, and the anion is, for example, $ClO_4^-$, $PF_6^-$, $SbF_6^-$, $BF_4^-$, $B(C_6H_5)_4^-$, $CF_3SO_3^-$, or $SiF_6^{2-}$.

According to the embodiment of the present invention, the stereostructure of the complexes of formula (I) is represented as follows:

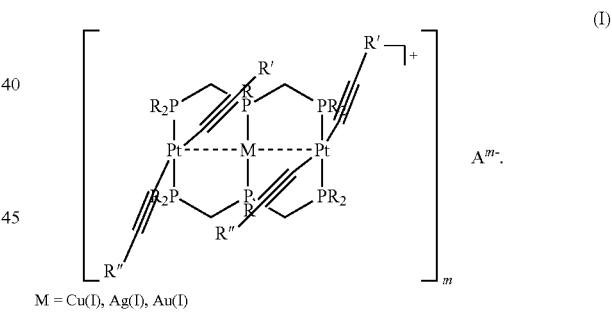

(I)

M = Cu(I), Ag(I), Au(I)

According to the embodiment of the present invention, in formula (I), $A^{m-}$ is selected from $ClO_4^-$, $PF_6^-$, $SbF_6^-$, $BF_4^-$, $B(C_6H_5)_4^-$, $CF_3SO_3^-$, or $SiF_6^{2-}$, and m is 1 or 2;

In one embodiment of the present invention, R is selected from groups of $C_{1-6}$ alkyl, $C_{1-6}$ alkenyl, $C_{1-6}$ alkynyl, $C_{6-12}$ aryl or 6- to 20-membered heteroaryl that are unsubstituted or optionally substituted by 1-5 substituents of $C_{1-6}$ alkyl, aryl, halogen (F, Cl, Br, I), trihalomethyl (—$CX_3$, X=F, Cl, Br), nitro (—$NO_2$), cyano (—CN), —$OR^3$, —$N(R^4)_2$, —CO—$R^5$, sulfo (—$SO_3H$), sulfonyl [—$S(=O)_2R^6$], sulfoxide [—$S(=O)R^6$], —P(=O)$(R^7)_2$, tertiary amine cation (—$N(R^8)_3^+$), or N-substituted pyridyl cation [—$C_5H_4N(R^9)^+$].

In one embodiment of the present invention, R' and R" are identical or different, independently selected from groups of $C_{1-6}$ alkyl, $C_{1-6}$ alkenyl, $C_{1-6}$ alkynyl, $C_{6-12}$ aryl or 6- to 20-membered heteroaryl that are unsubstituted or optionally substituted by 1-5 substituents of $C_{1-6}$ alkyl, $C_{1-6}$ alkenyl, $C_{1-6}$ alkynyl, aryl, halogen, trihalomethyl(—$CX_3$, X=F, Cl, Br), nitro (—$NO_2$), cyano (—CN), —$OR^3$, —$N(R^4)_2$, —CO—$R^5$, sulfo (—$SO_3H$), sulfonyl [—$S(=O)_2R^6$], sulfoxide [—$S(=O)R^6$], —$P(=O)(R^7)_2$, tertiary amine cation (—$N(R^8)_3{}^+$), or N-substituted pyridyl cation [—$C_5H_4N(R^9)^+$].

In one embodiment of the present invention, R is selected from $C_{6-12}$ aryl or 6- to 20-membered heteroaryl that is unsubstituted or optionally substituted by 1-5 substituents of $C_{1-6}$ alkyl.

In one embodiment of the present invention, R' and R" are identical or different, independently selected from $C_{6-12}$ aryl or 6- to 20-membered heteroaryl that is unsubstituted or optionally substituted by 1-5 substituents of CN, halogen, $C_{1-6}$ alkyl, halogenated $C_{1-6}$ alkyl.

As an example, the $Pt_2M$ heterotrinuclear metal-organic alkynyl complex is selected from the following structures:

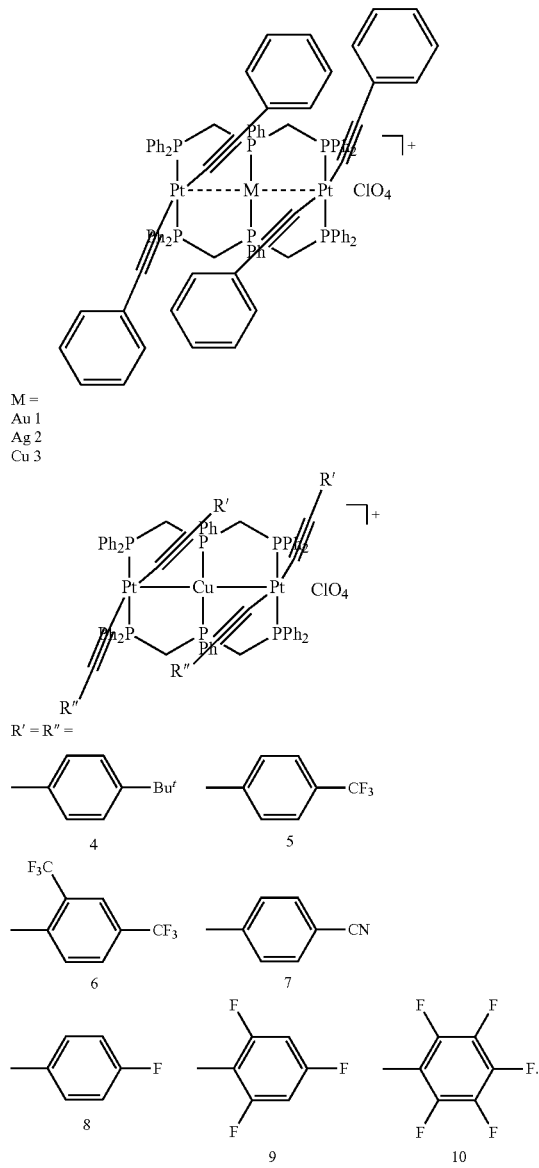

A preparation method of the above complexes of formula (I) is also provided in the invention, including the following steps:
1) dpmp and M-solvent complexes reacting in a solvent to obtain an intermediate;
2) the intermediate obtained in step 1) reacting with $Pt(PPh_3)_2(C≡CR')(C≡CR")$ in a solvent to obtain the complexes of formula (I);
wherein, dpmp stands for bis((diphenylphosphino)methyl)(phenyl)phosphine, $PPh_3$ stands for triphenylphosphine, and M, R' and R" are as defined above.

Preferably, the M-solvent complexes are selected from $[Au(tht)_2]_m(A^{m-})$ or $[Ag(tht)]_m(A^{m-})$ or $[Cu(MeCN)_4]_m(A^{m-})$, wherein tht is tetrahydrothiophene, MeCN is acetonitrile, and $A^{m-}$ is as defined above.

According to the embodiment of the present invention, in the preparation method of the complexes of formula (I), the solvent is halogenated hydrocarbon, such as dichloromethane.

According to the embodiment of the present invention, the molar ratio of dpmp:Au(I), Ag(I) or Cu(I) ion:$Pt(PPh_3)_2(C≡CR')(C≡CR")$ is 2-3.0:1-1.5:2-3.0, preferably 2:1:2.

According to the embodiment of the present invention, the reaction temperature is 5-40° C.

According to the embodiment of the present invention, the reaction time is 4-16 hours.

According to the embodiment of the present invention, after completion of the reaction, silica gel column chromatography is used for separation and purification.

The complexes of formula (I) of the invention present phosphorescence emission in solid and thin films, and the color distribution of the emitted light is relatively broad from blue-green to orange-red.

Therefore, the use of the complexes of formula (I) as photochromic materials in the fields of displays, lighting, sensors, and biomarkers is also provided in the invention.

Among the complexes of formula (I) of the invention, the $Pt_2Cu$ complexes exhibit reversible photochromic properties, in which the colors of the complexes change rapidly from colorless or light color (lighter color) to green or red color under 200-400 nm ultraviolet irradiation; after stopping ultraviolet irradiation, the green or red color fades, and returns to the initial state of colorless or light color (lighter color). The time of the color fading is related to the substituents in the organic ligands. The more electron deficient (withdrawing) the substituents in the organic ligands, the longer it takes for the green or red color to fade.

The present invention first reports this kind of the photochromic compounds having a self-recovery function. Under UV irradiation, the Pt(II)-M(I) heterotrinuclear complexes change color rapidly, and transform from state 1 to state 2; when UV light is turned off, the compounds gradually return to the original colors, while they transform from state 2 automatically back to state 1. This kind of self-recovery photochromism is of great application value in the fields of anti-counterfeiting, information encryption and decryption, product identification, etc.

Therefore, the use of the above $Pt_2Cu$ complexes of formula (I) of the invention is further provided, and because of the reversible self-recovery photochromic performance of the complexes, the complexes can be used in the fields of trademark anti-counterfeiting, information encryption and decryption, product identification, etc.

Compared with the prior art, the present invention has the following advantages:
1) The invention discloses a new type of self-recovery photochromic materials. The $Pt_2Cu$ complexes change their colors rapidly from colorless or light color (lighter color) to green or red color under ultraviolet irradiation at room temperature, and after stopping ultraviolet irradiation, they gradually change to colorless or light color again. The complexes present a sensitive photochromic response, and the self-recovery time required for the recovery from colors to colorless or light color due to different substituents in the complexes varies from seconds to hours, which are of great application value in the fields of anti-counterfeiting, and information encryption and decryption;

2) The complexes of formula (I) of the invention present phosphorescence emission in solid and thin films, and the color distributions of the emitted light are relatively broad from blue-green to orange-red. Therefore, the complexes of formula (I) as photochromic materials can be used in the fields of displays, lighting, sensors, and biomarkers.

Definition and Description of Terms

Unless defined otherwise, all technical and scientific terms used herein have the same meaning as commonly understood by one of ordinary skill in the art to which the subject matter of the claims belongs. It should be understood that the foregoing general description and the following detailed description are exemplary and explanatory only, and are not intended to limit the subject matter of this application. In the disclosure, unless otherwise stated, "more" means three or more.

The term "halogen" refers to fluorine, chlorine, bromine, or iodine.

The term "alkyl" refers to a branched-chain or straight-chain alkyl group of 1 to 12 carbon atoms, preferably 1 to 10 carbon atoms, such as methyl, ethyl, n-propyl, isopropyl, n-butyl, isobutyl, t-butyl, pentyl, or neopentyl.

The term "alkenyl" should be understood to refer preferably to a straight-chain or branched-chain hydrocarbon group, which contains one or more double bonds and has 2 to 12 carbon atoms, preferably "$C_{2-10}$ alkenyl". "$C_{2-10}$ alkenyl" should be understood to refer preferably to a straight-chain or branched-chain monovalent hydrocarbon group, which contains one or more double bonds and has 2, 3, 4, 5, 6, 7, 8, 9 or 10 carbon atoms, particularly 2 or 3 carbon atoms ("$C_{2-3}$ alkenyl"), and it should be understood that in the case of the alkenyl containing more than one double bond, the double bonds possibly being separated from or conjugated with each other. The alkenyl is, for example, vinyl, allyl, (E)-2-methylvinyl, (Z)-2-methylvinyl, (E)-but-2-enyl, (Z)-but-2-enyl, (E)-but-1-enyl, (Z)-but-1-enyl, pent-4-enyl, (E)-pent-3-enyl, (Z)-pent-3-enyl, (E)-pent-2-enyl, (Z)-pent-2-enyl, (E)-pent-1-enyl, (Z)-pent-1-enyl, hex-5-enyl, (E)-hex-4-enyl, (Z)-hex-4-enyl, (E)-hex-3-enyl, (Z)-hex-3-enyl, (E)-hex-2-enyl, (Z)-hex-2-enyl, (E)-hex-1-enyl, (Z)-hex-1-enyl, isopropenyl, 2-methylprop-2-enyl, 1-methylprop-2-enyl, 2-methylprop-1-enyl, (E)-1-methylprop-1-enyl, (Z)-1-methylprop-1-enyl.

The term "alkynyl" should be understood to refer to a straight-chain or branched-chain monovalent hydrocarbon group, which contains one or more triple bonds and has 2 to 12 carbon atoms, preferably "$C_{2-10}$ alkynyl". The term "$C_{2-10}$ alkynyl" should be understood to refer preferably to a straight-chain or branched-chain hydrocarbon group, which contains one or more triple bonds and has 2, 3, 4, 5, 6, 7, 8, 9 or 10 carbon atoms, particularly 2 or 3 carbon atoms ("$C_{2-3}$ alkynyl"). The alkynyl is, for example, ethynyl, prop-1-ynyl, prop-2-ynyl, but-1-ynyl, but-2-ynyl, but-3-ynyl, pent-1-ynyl, pent-2-ynyl, pent-3-ynyl, pent-4-ynyl, hex-1-ynyl, hex-2-ynyl, hex-3-ynyl, hex-4-ynyl, hex-5-ynyl, 1-methylprop-2-ynyl, 2-methylbut-3-ynyl, 1-methylbut-3-ynyl, 1-methylbut-2-ynyl, 3-methylbut-1-ynyl.

The term "aryl" should be understood to refer preferably to a monovalent or partially aromatic monocyclic, bicyclic or tricyclic hydrocarbon ring having 5 to 20 carbon atoms, preferably "$C_{6-14}$ aryl". The term "$C_{6-14}$ aryl" should be understood to refer preferably to a monovalent or partially aromatic monocyclic, bicyclic or tricyclic hydrocarbon ring having 6, 7, 8, 9, 10, 11, 12, 13 or 14 carbon atoms ("$C_{6-14}$ aryl"), particularly a ring having 6 carbon atoms ("$C_6$ aryl") such as phenyl or biphenyl, or a ring having 9 carbon atoms ("$C_9$ aryl") such as indanyl or indenyl, or a ring having 10 carbon atoms ("$C_{10}$ aryl") such as tetrahydronaphthyl, dihydronaphthyl or naphthyl, or a ring having 13 carbon atoms ("$C_{13}$ aryl") such as fluorenyl, or a ring having 14 carbon atoms ("$C_{14}$ aryl") such as anthracene.

The term "heteroaryl" should be understood to be a monocyclic, bicyclic or tricyclic ring system containing 5-20 ring atoms, 5-14 ring atoms, 5-12 ring atoms, 5-10 ring atoms, or 5-6 ring atoms, in which at least one ring system is aromatic and at least one ring system contains one or more heteroatoms (e.g., N, O, S, Se, B, Si, P, etc.), wherein each ring system contains a ring having 5-7 atoms, and has one or more points of attachment to the rest of the molecule. The heteroaryl group is optionally replaced by one or more substituents described in the present invention. In some embodiments, heteroaryl groups composed of 5-10 atoms contain 1, 2, 3 or 4 heteroatoms independently selected from O, S, Se or N. In other embodiments, heteroaryl groups composed of 5-6 atoms contain 1, 2, 3 or 4 heteroatoms independently selected from O, S, Se or N.

Examples of monocyclic heteroaryl groups include, but are not limited to, thienyl, furyl, pyrrolyl, oxazolyl, thiazolyl, imidazolyl, pyrazolyl, isoxazolyl, isothiazolyl, oxadiazolyl, triazolyl, thiadiazolyl, thia-4H-zolyl, etc., and their benzo derivatives, such as benzofuryl, benzothienyl, benzoxazolyl, benzoisoxazolyl, benzimidazolyl, benzotriazolyl, indazolyl, indolyl, isoindolyl, etc.; or pyridyl, pyridazinyl, pyrimidinyl, pyrazinyl, triazinyl, etc., and their benzo derivatives, such as quinolinyl, quinazolinyl, isoquinolinyl, etc.; or azocinyl, indolinzinyl, purinyl, etc., and their benzo derivatives; or cinnolinyl, phthalazinyl, quinoxalinyl, naphthalyl, pteridinyl, carbazolyl, acridinyl, phenazinyl, phenothiazinyl, phenoxazinyl, etc.

EXAMPLES

Figure 1:
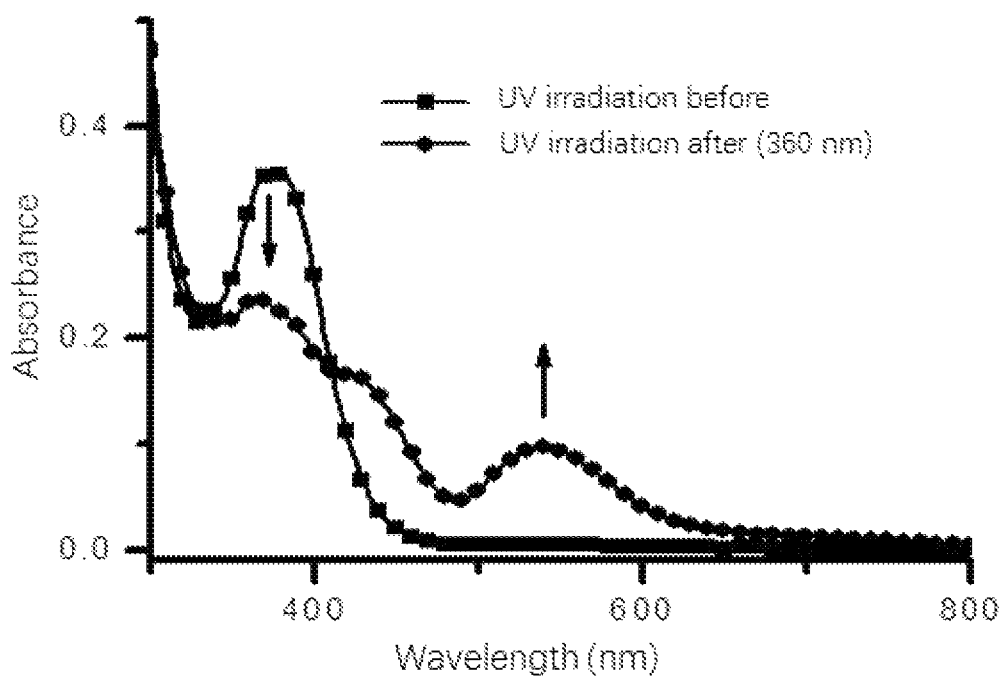
FIG. 1: In Example 12, the absorption spectra of complex 5 before and after UV irradiation at 365 nm.

To make the objects, technical solutions and technical effects clearer, the present invention will be further illustrated in detail below in combination with the drawings and the examples. It should be understood that the examples described in the description are only to explain the invention and are not intended to limit the invention.

In the following examples, dpmp stands for bis((diphenylphosphino)methyl)(phenyl)phosphine, Ph stands for phenyl, tht stands for tetrahydrothiophene, PPh$_3$ stands for triphenylphosphine, MeCN is acetonitrile, and ClO$_4^-$ is perchlorate.

Example 1: Preparation of Pt$_2$Au Complex [Pt$_2$Au(μ-Dpmp)$_2$(C≡CC$_6$H$_5$)$_4$](ClO$_4$) (Complex 1)

To a dichloromethane solution (20 mL) of dpmp (50.6 mg, 0.1 mmol) was added [Au(tht)$_2$](ClO$_4$) (23.6 mg, 0.05 mmol) with stirring until the solid was completely dissolved. Upon stirring for 5 mins, platinum complex Pt(PPh$_3$)$_2$(C≡CPh)$_2$ (92.2 mg, 0.1 mmol) was added to the above solution. The color of the solution changed from colorless or light color to light yellow after the platinum complex was dissolved rapidly. The solution was stirred for 4 hours at room temperature, then concentrated to 2 mL. The product was then purified by silica gel column chromatography using dichloromethane-acetone (10:1) as eluent.

Yield: 83%. Elemental analysis C$_{96}$H$_{78}$AuClO$_4$P$_6$Pt$_2$, calculated: C, 54.80; H, 3.74. Found: C, 54.73; H, 3.78. ESI-MS (%): 2004.9 (100) [M-ClO$_4$]$^+$. $^1$H-NMR (CD$_2$Cl$_2$, ppm): 7.86-7.80 (m, 12H), 7.72-7.67 (m, 8H), 7.40-7.33 (m, 12H), 7.17-7.11 (m, 6H), 7.05-6.81 (m, 24H), 6.47-6.46 (d, 4H, J=7.4 Hz), 6.28-6.26 (d, 4H, J=7.0 Hz), 4.40-4.23 (m, 8H). $^{31}$P-NMR (CD$_2$Cl$_2$, ppm): 17.7 (m, 2P, J$_{P-P}$=32.3 Hz), 4.4 (t, 4P, J$_{P-P}$=28.3 Hz, J$_{Pt-P}$=2676 Hz). IR (KBr, cm$^{-1}$): 2103 (m), 1102 (s).

Example 2: Preparation of Pt$_2$Ag Complex [Pt$_2$Ag(μ-Dpmp)$_2$(C≡CC$_6$H$_5$)$_4$](ClO$_4$) (Complex 2)

The preparation method was similar to that in Example 1, except that Au(tht)(ClO$_4$) was replaced by [Ag(tht)$_2$](ClO$_4$).

Yield: 79%. Elemental analysis C$_{96}$H$_{78}$AgClO$_4$P$_6$Pt$_2$, calculated: C, 57.22; H, 3.90. Found: C, 57.19; H, 3.96. ESI-MS (%): 1915.6 (100) [M-ClO$_4$]$^+$. $^1$H-NMR (CD$_2$Cl$_2$, ppm): 7.80-7.73 (m, 12H), 7.60-7.55 (m, 8H), 7.40-7.30 (m, 12H), 7.21-7.16 (m, 6H), 7.06-7.00 (m, 12H), 6.93-6.84 (m, 12H), 6.58-6.56 (d, 4H, J=7.2 Hz), 6.27-6.25 (d, 4H, J=7.1 Hz), 3.97-3.90 (m, 4H), 3.74-3.69 (m, 4H). $^{31}$P-NMR (CD$_2$Cl$_2$, ppm): 10.9 (t, 4P, J$_{P-P}$=37.4 Hz, J$_{Pt-P}$=2622 Hz), 13.0 (m, 2P, J$_{P-P}$=43.0 HZ, J$_{Ag-P}$=496 Hz). IR (KBr, cm$^{-1}$): 2104 (w), 1103 (s).

Example 3: Preparation of Pt$_2$Cu Complex [Pt$_2$Cu(μ-Dpmp)$_2$(C≡CC$_6$H$_5$)$_4$](ClO$_4$) (Complex 3)

The preparation method was similar to that in Example 1, except that Au(tht)(ClO$_4$) was replaced by [Cu(MeCN)$_4$](ClO$_4$).

Yield: 75%. Elemental analysis C$_{96}$H$_{78}$ClCuO$_4$P$_6$Pt$_2$·H$_2$O, calculated: C, 57.98; H, 4.05. Found: C, 58.04; H, 4.12. HRMS m/z (%): 1870.3123 (100) [M-ClO$_4$]$^+$, calculated: 1870.3124. $^1$H-NMR (CD$_2$Cl$_2$, ppm): 8.02-7.98 (m, 4H), 7.89-7.84 (m, 8H), 7.52-7.49 (t, 4H, J=7.3 Hz), 7.44-7.35 (m, 10H), 7.26-7.17 (m, 12H), 7.13-7.10 (t, 4H, J=7.5 Hz), 7.03-7.00 (t, 8H, J=7.6 Hz), 6.93-6.81 (m, 8H), 6.69-6.65 (t, 4H, J=7.8 Hz), 6.53-6.51 (d, 4H, J=7.2 Hz), 6.04-6.02 (d, 4H, J=7.9 Hz), 3.95-3.80 (m, 4H), 3.71-3.63 (m, 4H). $^{31}$P-NMR (CD$_2$Cl$_2$, ppm): 11.2 (t, 4P, J$_{P-P}$=37.2 Hz, J$_{Pt-P}$=2548 Hz), 13.4 (m, 2P, J$_{P-P}$=41.0 Hz). IR (KBr, cm$^{-1}$): 2115 (w), 1101 (s).

Example 4: Preparation of Pt$_2$Cu Complex [Pt$_2$Cu(μ-Dpmp)$_2$(C≡CC$_6$H$_4$Bu$^t$-4)$_4$](ClO$_4$) (Complex 4)

The preparation method was similar to that in Example 1, except that Pt(PPh$_3$)$_2$(C≡CC$_6$H$_5$)$_2$ was replaced by Pt(PPh$_3$)$_2$ (C≡CC$_6$H$_4$Bu$^t$-4)$_2$, and [Au(tht)$_2$](ClO$_4$) was replaced by [Cu(MeCN)$_4$](ClO$_4$).

Yield: 79%. Elemental analysis C$_{112}$H$_{110}$ClCuO$_4$P$_6$Pt$_2$, calculated: C, 61.28; H, 5.05. Found: C, 61.40; H, 5.12. HRMS m/z (%): 2095.5614 (100) [M-ClO$_4$]$^+$, calculated: 2095.5644. $^1$H-NMR (CD$_2$Cl$_2$, ppm): 7.98-7.93 (m, 4H), 7.87-7.84 (m, 8H), 7.54-7.50 (t, 4H, J=7.3 Hz), 7.43-7.36 (m, 10H), 7.25-7.19 (m, 12H), 7.14-7.10 (t, 4H, J=7.3 Hz), 7.04-7.00 (t, 8H, J=7.4 Hz), 6.87-6.85 (d, 4H, J=8.0 Hz), 6.69-6.67 (d, 4H, J=7.7 Hz), 6.54-6.52 (d, 4H, J=7.5 Hz), 5.98-5.96 (d, 4H, J=7.0 Hz), 3.82-3.65 (m, 8H), 1.16 (s, 18H), 1.13 (s, 18H). $^{31}$P-NMR (CD$_2$Cl$_2$, ppm): 10.7 (m, 4P, J$_{P-P}$=37.2 Hz, J$_{Pt-P}$=2592 Hz), 14.5 (m, 2P, J$_{P-P}$=40.2 Hz). IR (KBr, cm$^{-1}$): 2112 (w), 1101 (s).

Example 5: Preparation of Pt$_2$Cu Complex [Pt$_2$Cu(μ-Dpmp)$_2$(C≡CC$_6$H$_4$CF$_3$-4)$_4$](ClO$_4$) (Complex 5)

The preparation method was similar to that in Example 1, except that Pt(PPh$_3$)$_2$(C≡CC$_6$H$_5$)$_2$ was replaced by Pt(PPh$_3$)$_2$ (C≡CC$_6$H$_4$CF$_3$-4)$_2$, and [Au(tht)$_2$](ClO$_4$) was replaced by [Cu(MeCN)$_4$](ClO$_4$).

Yield: 73%. Elemental analysis C$_{100}$H$_{74}$ClCuF$_{12}$O$_4$P$_6$Pt$_2$, calculated: C, 53.56; H, 3.33. Found: C, 53.27; H, 3.49. HRMS m/z (%): 2142.2597 (100) [M-ClO$_4$]$^+$. Calculated: 2142.2623. $^1$H-NMR (CD$_2$Cl$_2$, ppm): 7.99-7.94 (m, 4H), 7.87-7.83 (m, 8H), 7.51-7.47 (t, 4H, J=7.3 Hz), 7.41-7.33 (m, 10H), 7.27-7.17 (m, 12H), 7.11-7.07 (t, 4H, J=7.6 Hz), 7.03-6.99 (t, 8H, J=7.6 Hz), 6.43-6.36 (m, 8H), 6.22-6.20 (d, 4H, J=8.7 Hz), 5.95-5.93 (d, 4H, J=8.7 Hz), 3.91-3.79 (m, 4H), 3.67-3.59 (m, 4H). $^{31}$P-NMR (CD$_2$Cl$_2$, ppm): 11.1 (m, 4P, J$_{P-P}$=37.3 Hz, J$_{Pt-P}$=2596 Hz), 14.1 (m, 2P, J$_{Pt-P}$=42.2 Hz), IR (KBr, cm$^{-1}$): 2115 (w), 1102 (s).

Example 6: Preparation of Pt$_2$Cu Complex [Pt$_2$Cu(μ-Dpmp)$_2$(C≡CC$_6$H$_4$CF$_3$-2,4)$_4$](ClO$_4$) (Complex 6)

The preparation method was similar to that in Example 1, except that Pt(PPh$_3$)$_2$(C≡CC$_6$H$_5$)$_2$ was replaced by Pt(PPh$_3$)$_2$ (C≡CC$_6$H$_4$CF$_3$-2,4)$_2$, and [Au(tht)$_2$](ClO$_4$) was replaced by [Cu(MeCN)$_4$](ClO$_4$).

Yield: 67%. Elemental analysis C$_{104}$H$_{70}$ClCuF$_{24}$O$_4$P$_6$Pt$_2$, calculated: C, 49.67; H, 2.81. Found: C, 49.60; H, 2.84. HRMS m/z (%): 2414.2131 (100) [M-ClO$_4$]$^+$. Calculated: 2414.2119. $^1$H-NMR (CD$_2$Cl$_2$, ppm): 8.02-7.96 (m, 8H), 7.88-7.81 (m, 4H), 7.49 (s, 2H), 7.45-7.36 (m, 10H), 7.28-7.22 (m, 12H), 7.20 (d, 4H, J=7.9 Hz), 7.12 (t, 4H, J=7.7 Hz), 6.98 (t, 4H, J=7.6 Hz), 6.84 (t, 8H, J=8.1 Hz), 6.48 (d, 2H, J=8.3 Hz), 6.29 (d, 2H, J=8.3 Hz), 6.09 (d, 2H, J=8.0 Hz), 4.11-3.97 (m, 4H), 3.80-3.67 (m, 4H). $^{31}$P-NMR (CD$_2$Cl$_2$, ppm): 11.5 (m, 4P, J$_{P-P}$=37.1 Hz, J$_{Pt-P}$=2587 Hz), 14.0 (m, 2P, J$_{P-P}$=42.7 Hz), IR (KBr, cm$^{-1}$): 2116 (w), 1102 (s).

Example 7: Preparation of Pt$_2$Cu Complex [Pt$_2$Cu(μ-Dpmp)$_2$(C≡CC$_6$H$_4$CN-4)$_4$](ClO$_4$) (Complex 7)

The preparation method was similar to that in Example 1, except that Pt(PPh$_3$)$_2$(C≡CC$_6$H$_5$)$_2$ was replaced by Pt(PPh$_3$)$_2$ (C≡CC$_6$H$_4$CN-4)$_2$, and [Au(tht)$_2$](ClO$_4$) was replaced by [Cu(MeCN)$_4$](ClO$_4$).

Yield: 72%. Elemental analysis $C_{100}H_{74}ClCuN_4O_4P_6Pt_2$, calculated: C, 58.00; H, 3.60. Found: C, 57.71; H, 3.78. HRMS m/z (%): 1970.2901 (100) [M-$ClO_4$]$^+$. Calculated: 1970.2937. $^1$H-NMR (d-DMSO, ppm): 8.13-8.05 (m, 4H), 7.88-7.81 (m, 8H), 7.59-7.39 (m, 14H), 7.31-7.20 (m, 16H), 7.12-7.02 (m, 16H), 6.28 (d, 4H, J=8.3 Hz), 6.00 (d, 4H, J=8.4 Hz), 4.47-4.26 (m, 4H), 3.91-3.76 (m, 4H). $^{31}$P-NMR (d-DMSO, ppm): 11.3 (m, 4P, $J_{P-P}$=37.1 Hz, $J_{Pt-P}$=2519 Hz), 11.1 (m, 2P, $J_{P-P}$=39.0 Hz), IR (KBr, cm$^{-1}$): 2224 (s), 2114 (s), 1101 (s).

Example 8: Preparation of Pt$_2$Cu Complex [Pt$_2$Cu (μ-Dpmp)$_2$(C≡CC$_6$H$_5$F-4)$_4$](ClO$_4$) (Complex 8)

The preparation method was similar to that in Example 1, except that Pt(PPh$_3$)$_2$(C≡CC$_6$H$_5$)$_2$ was replaced by Pt(PPh$_3$)$_2$ (C≡CC$_6$H$_5$F-4)$_2$, and [Au(tht)$_2$](ClO$_4$) was replaced by [Cu(MeCN)$_4$](ClO$_4$).

Yield: 75%. Elemental analysis $C_{96}H_{74}ClCuF_4O_4P_6Pt_2$, calculated: C, 56.45; H, 3.65. Found: C, 56.17; H, 3.68. HRMS m/z (%): 1942.2743 (100) [M-$ClO_4$]$^+$. Calculated: 1942.2750. $^1$H-NMR (d-DMSO, ppm): 8.15-8.02 (m, 4H), 7.93-7.79 (m, 8H), 7.60-7.35 (m, 14H), 7.35-7.20 (m, 12H), 7.15-6.99 (m, 12H), 6.65 (t, 4H, J=8.94 Hz), 6.48 (t, 4H, J=8.88 Hz), 6.26 (dd, 4H, $J_1$=8.68 Hz, $J_2$=5.64 Hz), 5.89 (dd, 4H, $J_1$=8.78 Hz, $J_2$=5.66 Hz), 4.41-4.20 (m, 4H), 3.78-3.60 (m, 4H). $^{31}$P-NMR (d-DMSO, ppm): 11.2 (m, 4P, $J_{P-P}$=37.0 Hz, $J_{Pt-P}$=2554 Hz), 12.41 (m, 2P, $J_{P-P}$=39.7 Hz), IR (KBr, cm$^{-1}$): 2114 (w), 1100 (s).

Example 9: Preparation of Pt$_2$Cu Complex [Pt$_2$Cu (μ-Dpmp)$_2$(C≡CC$_6$H$_2$F$_3$-2,4,6)$_4$](ClO$_4$) (Complex 9)

The preparation method was similar to that in Example 1, except that Pt(PPh$_3$)$_2$(C≡CC$_6$H$_5$)$_2$ was replaced by Pt(PPh$_3$)$_2$ (C≡CC$_6$F$_3$-2,4,6)$_2$, and [Au(tht)$_2$](ClO$_4$) was replaced by [Cu(MeCN)$_4$](ClO$_4$).

Yield: 79%. Elemental analysis $C_{96}H_{66}ClCuF_{12}O_4P_6Pt_2$, calculated: C, 52.73; H, 3.04. Found: C, 52.32; H, 3.11. HRMS m/z (%): 2086.1989 (100) [M-$ClO_4$]$^+$. Calculated: 2086.1996. $^1$H-NMR (d-DMSO, ppm): 8.00-7.89 (m, 4H), 7.89-7.77 (m, 8H), 7.53-7.31 (m, 14H), 7.15 (q, 8H, J=6.36), 7.09-6.94 (m, 8H), 6.83 (t, 12H, J=7.94), 6.65 (t, 4H, J=8.42), 4.60-4.37 (m, 4H), 3.88-3.74 (m, 4H). $^{31}$P-NMR (d-DMSO, ppm): 9.38 (m, 4P, $J_{P-P}$=35.4 Hz, $J_{Pt-P}$=2547 Hz), 10.4 (m, 2P, $J_{P-P}$=37.9 Hz), IR (KBr, cm$^{-1}$): 2119 (w), 1101 (s).

Example 10: Preparation of Pt$_2$Cu Complex [Pt$_2$Cu (μ-Dpmp)$_2$(C≡CC$_6$F$_5$)$_4$](ClO$_4$) (Complex 10)

The preparation method was similar to that in Example 1, except that Pt(PPh$_3$)$_2$(C≡CC$_6$H$_5$)$_2$ was replaced by Pt(PPh$_3$)$_2$ (C≡CC$_6$F$_5$), and [Au(tht)$_2$](ClO$_4$) was replaced by [Cu(MeCN)$_4$](ClO$_4$).

Yield: 74%. Elemental analysis $C_{96}H_{58}ClCuF_{20}O_4P_6Pt_2$, calculated: C, 49.48; H, 2.51. Found: C, 49.32; H, 2.66. HRMS m/z (%): 2230.1259 (100) [M-$ClO_4$]$^+$. Calculated: 2230.1242. $^1$H-NMR (d-DMSO, ppm): 8.04-7.95 (m, 4H), 7.94-7.81 (m, 8H), 7.60-7.32 (m, 14H), 7.17-7.00 (m, 16H), 7.93-6.85 (m, 8H), 4.79-4.54 (m, 4H), 3.88-3.68 (m, 4H). $^{31}$P-NMR (d-DMSO, ppm): 10.0 (m, 4P, $J_{P-P}$=35.5 Hz, $J_{Pt-P}$=2483 Hz), 9.65 (m, 2P, $J_{P-P}$=37.6 Hz), IR (KBr, cm$^{-1}$): 2130 (w), 1101 (s).

Example 11: Photochromic Performance Test of Complexes 1-5

The excitation spectra, emission spectra, luminescence lifetimes and luminescence quantum yields of complexes 1-5 prepared in Example 1, 2, 3, 4, 5 in different states were measured on Edinburgh FLS920 fluorescence spectrometer, respectively. The luminescence quantum yields of the samples were determined by using a 142-mm-diameter integrating sphere. The detailed results were shown in Table 1.

TABLE 1

Photochromic performance data of the phosphorescent complexes 1-5 of the present invention

| Complex | CH$_2$Cl$_2$ solution[a] | | | Solid powder[b] | | | PMMA thin film[c] | | |
|---|---|---|---|---|---|---|---|---|---|
| | $λ_{em}$ [nm] | $τ_{em}$ [μs] | $Φ_{em}$ [%] | $λ_{em}$ [nm] | $τ_{em}$ [μs] | $Φ_{em}$ [%] | $λ_{em}$ [nm] | $τ_{em}$ [μs] | $Φ_{em}$ [%] |
| 1 | 494 | 1.19 | 0.20 | 550 | 0.46 | 11.9 | 542 | 3.12 | 30.9 |
| 2 | 506 | 0.93 | <0.1 | 511 | 0.10 | 4.00 | 517 | 1.35 | 3.78 |
| 3 | 602 | 1.82 | <0.1 | 513 | 1.07 | 0.86 | 506 | 8.60 | 4.80 |
| 4 | 606 | 2.36 | <0.1 | 502 | 0.52 | 0.50 | 489 | 6.32 | 11.47 |
| 5 | 590 | 1.94 | <0.1 | 500 | 0.87 | 1.30 | 503 | 8.41 | 2.79 |

[a]deoxygenated dichloromethane solution with a concentration of 1 × 10$^{-5}$ mol/L,
[b]crystalline sample obtained by diffusion of dichloromethane and n-hexane and removing the solvent,
[c]doped PMMA film with 3% mass fraction (complex 3%).

It can be seen from the results in Table 1 that the complexes prepared in Examples 1-5 all present phosphorescence emission, and the color distribution of the emitted light of the complexes is relatively broad from blue-green to orange-red, therefore the complexes as photochromic materials can be used in the fields of displays, lighting, sensors, and biomarkers.

Example 12: Photochromic Performance Test of Complexes 3-10

Figure 2:
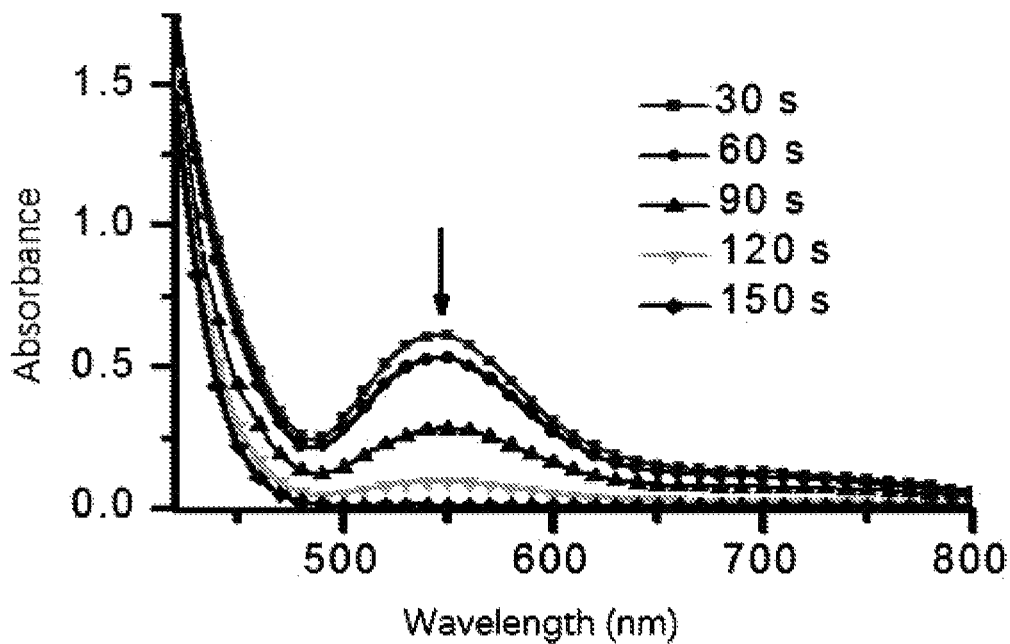
FIG. 2: In Example 12, the absorption spectral changes of complex 5 after stopping UV irradiation at 365 nm.
Figure 3:
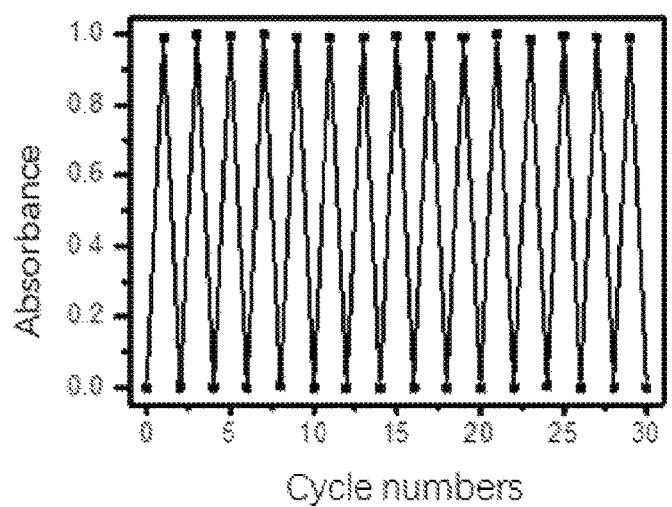
FIG. 3: In Example 7, the relationship between the absorbance values of complex 5 at 550 nm and the irradiation times before and after the UV irradiation at a wavelength of 365 nm (fatigue test).
Figure 4:
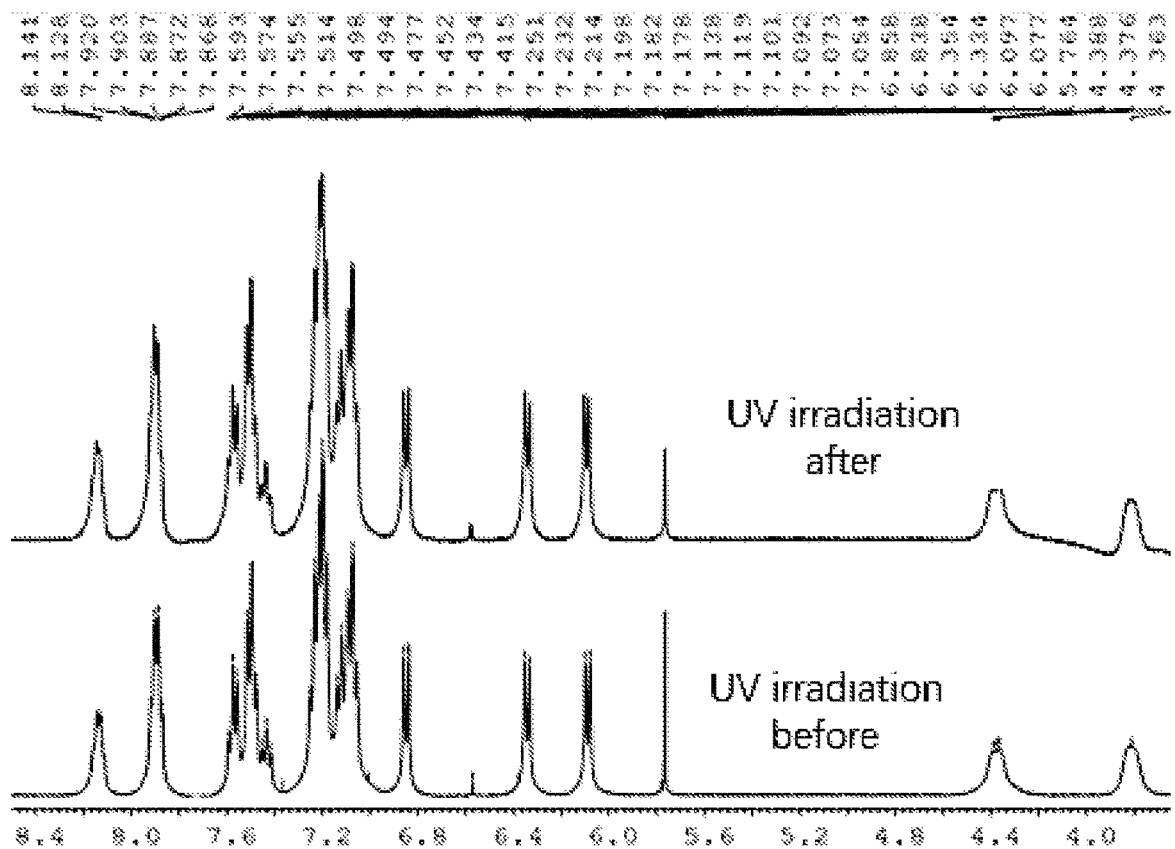
FIG. 4: In Example 12, the $^1$HNMR spectra of complex 5 in 10 hours before and after ultraviolet irradiation at a wavelength of 365 nm.

Complexes 3-10 in Examples 3-10 had sensitive photochromic properties. Among them, with complex 5 as an example, after UV irradiation for a few seconds with wavelengths of 200-400 nm, both dilute solution and PMMA (polymethylmethacrylate) doped film presented significant photochromic properties. The colors of complexes in Examples 3-8 changed from colorless to red color, and the colors of complexes in Example 9 and 10 changed from light yellow to green color. The absorption spectral changes before and after UV irradiation of complexes were measured on Perkin Elmer lambda 35 UV/Vis absorption spectrometer, respectively. The UV absorption spectra of complex 5 were shown in FIG. 1. FIG. 1 showed that after the sample of complex 5 in the solution state was placed under UV irradiation for about 10 seconds, an obvious absorption peak appeared at 550 nm. And after stopping UV irradiation, the absorption peak turned reversibly to the initial state immediately, as shown in FIG. 2, it returned to the initial state after stopping irradiation for 150 seconds. The fatigue test was carried out for the color change phenomenon of complex 5, as shown in FIG. 3. The absorbance of the dichloromethane solution of complex 5 after UV irradiation at 365 nm for 20 seconds and the absorbance at 550 nm after stopping irradiation for 150 seconds were measured, respectively. After repeated cycles, the absorbance of complex 5 at 550 nm did not decline. The $^1$H NMR spectra of complex 5 in d-DMSO did not change significantly by comparing the $^1$H NMR spectra before and after UV irradiation for 10 hours at 365 nm (as shown in FIG. 4), which indicated that the complex was not decomposed after a long period of UV irradiation to exhibit excellent photochemical stability.

TABLE 2

Photochromic performance data of the complexes 3-10 of the present invention (UV-visible absorption spectra)

| Complex | UV irradiation | $\lambda_{abs}$/nm ($\varepsilon$/dm$^3$ mol$^{-1}$ cm$^{-1}$) | Self-recovery lifetime for the color change [a] |
|---|---|---|---|
| 3 | before | 261(60300), 380(14027), 546(56) | 8.9 seconds |
|   | after  | 261(60353), 380(12972), 546(580) | |
| 4 | before | 263(61400), 382(31050), 541(175) | 7.1 seconds |
|   | after  | 263(60565), 382(30065), 541(452) | |
| 5 | before | 270(63015), 378(35440), 540(493) | 35.2 seconds |
|   | after  | 270(65316), 378(22836), 540(9655) | |
| 6 | before | 267(58600), 356(13500), 542(118) | 536.1 seconds |
|   | after  | 267(58420), 356(11202), 542(875) | |
| 7 | before | 304(96731), 370(57820), 545(127) | 70.6 seconds |
|   | after  | 304(43269), 370(15270), 545(4099) | |
| 8 | before | 257(74138), 382(35999), 563(158) | 33.0 seconds |
|   | after  | 257(74460), 382(34599), 563(3083) | |
| 9 | before | 358(32128), 376(27276), 462(904), 600(176) | 56.3 minutes |
|   | after  | 358(12141), 376(11484), 462(28235), 600(5823) | |
| 10 | before | 351(30736), 384(23656), 464(893), 597(144) | 118.8 minutes |
|    | after  | 351(11351), 377(10058), 464(23033), 597(4577) | |

[a] Self-recovery lifetime for the color change was the time required for a absorbance (i.e. the maximum absorbance A) at a new maximum wavelength absorption peak, which is generated by the complex after 1 minute of irradiation with 365 nm ultraviolet light, decay to 1/e of the maximum absorbance A (A is the maximum absorbance at the maximum wavelength after irradiation, and e is the natural logarithm).

It can be seen from the results in Table 2 that complexes 3-10 of the invention are colorless or light yellow solutions in dichloromethane, but their absorption spectra change greatly after ultraviolet irradiation, and most notably, new absorption peaks appear in the range of 500-600 nm, resulting that their absorption colors change significantly and a photochromic response occurs. In addition, different substituents of the complexes can also adjust the response lifetime of the color change. It can be seen from Table 2 that for the metal complexes 3-10 with various organic substituents, broad absorption bands rapidly appear in the visible region after ultraviolet irradiation, and the maximum absorption peaks appear at a value of 540-600 nm, resulting that the colors of the solutions change from colorless or light yellow to green or red immediately, indicating that the complexes 3-10 exhibit very sensitive photochromic properties. However, the colors of the solutions gradually fade after stopping UV irradiation, indicating that the metastable state of green or red can reversibly return to the initial state of colorless or light yellow. It can also be seen from Table 2 that the time or speed required to recover from green or red to the colorless state is different, because the stability of metastable states accompanied by a color change varies depending on the different substituents in the organic ligands. The more electron deficient (withdrawing) the substituents in the organic ligands, the longer it takes to recover from the metastable state of photochromic green or red to the initial state of colorless.

The present invention first reported a kind of photochromic compounds having a self-recovery function. Under UV irradiation, the compounds changed from a colorless or light color state to a dark color state rapidly; when the UV light was turned off, the dark color state gradually returned to the light color state automatically. This kind of self-recovery photochromism was of great application value in the fields of anti-counterfeiting, information encryption and decryption, product identification, etc.

The embodiments of the present invention are described above. However, the present invention is not limited to the above embodiments. Any modification, equivalent alternative, improvement, etc., falling within the spirit and scope of the present invention, are intended to be included within the scope of the present invention.

The invention claimed is:

1. A Pt$_2$M heterotrinuclear metal-organic alkynyl complex of formula (I):

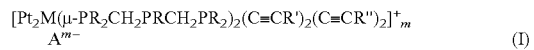

$$[Pt_2M(\mu\text{-}PR_2CH_2PRCH_2PR_2)_2(C\equiv CR')_2(C\equiv CR'')_2]^+{}_m \quad A^{m-} \qquad (I)$$

wherein, $\mu$ represents bridging; PR$_2$CH$_2$PRCH$_2$PR$_2$ is a tridentate phosphine ligand; the subscript number of each letter indicates the number of each group;

M is Au(I), Ag(I), or Cu(I);

R, R', and R'' are identical or different, independently selected from alkyl, alkenyl, alkynyl, aryl, and heteroaryl, which are unsubstituted or optionally substituted by one, two, or more R$^1$;

R$^1$ is selected from alkyl, alkenyl, alkynyl, aryl, halogen (F, Cl, Br, I), trihalomethyl (—CX$_3$, X=F, Cl, Br), —NO$_2$, —CN, —OR$^3$, —N(R$^4$)$_2$, —CO—R$^5$, —SO$_3$H, —S(=O)$_2$R$^6$, —S(=O)R$^6$, —P(=O)(R$^7$)$_2$, tertiary amine cation (—N(R$^8$)$_3{}^+$), and N-substituted pyridyl cation [—C$_5$H$_4$N(R$^9$)$^+$], which are unsubstituted or optionally substituted by one, two, or more R$^2$;

R$^2$ is selected from alkyl, alkenyl, alkynyl, aryl, halogen (F, Cl, Br, I), trihalomethyl (—CX$_3$, X=F, Cl, Br), —NO$_2$, —CN, —OR$^3$, —N(R$^4$)$_2$, —CO—R$^5$, —SO$_3$H, —S(=O)$_2$R$^6$, —S(=O)R$^6$, —P(=O)(R$^7$)$_2$, tertiary amine cation (—N(R$^8$)$_3{}^+$), and N-substituted pyridyl cation [—C$_5$H$_4$N(R$^9$)$^+$];

R$^3$ is alkyl, aryl, or heteroaryl; R$^4$ is identical or different, independently selected from H, alkyl, aryl, and heteroaryl; R$^5$ is H, —OH, alkyl, aryl, or heteroaryl; R$^6$, R$^7$, R$^8$, and R$^9$ are independently alkyl, aryl, or heteroaryl; and A$^{m-}$ is a monovalent or bivalent anion, and m is 1 or 2, and said anion is ClO$_4{}^-$, PF$_6{}^-$, SbF$_6{}^-$, BF$_4{}^-$, B(C$_6$H$_5$)$_4{}^-$, CF$_3$SO$_3{}^-$, or SiF$_6{}^{2-}$.

2. The complex according to claim 1, wherein, in formula (I), said $A^{m-}$ is selected from $ClO_4^-$, $PF_6^-$, $SbF_6^-$, $BF_4^-$, $B(C_6H_5)_4^-$, $CF_3SO_3^-$, and $SiF_6^{2-}$, and m is 1 or 2;

R is selected from $C_{1-6}$ alkyl, $C_{1-6}$ alkenyl, $C_{1-6}$ alkynyl, $C_{6-12}$ aryl or 6- to 20-membered heteroaryl, which are unsubstituted or optionally substituted by 1-5 substituents of $C_{1-6}$ alkyl, aryl, halogen (F, Cl, Br, I), trihalomethyl (—$CX_3$, X=F, Cl, Br), —$NO_2$, —CN, —$OR^3$, —$N(R^4)_2$, —CO—$R^5$, —$SO_3H$, —$S(=O)_2R^6$, —$S(=O)R^6$, —$P(=O)(R^7)_2$, tertiary amine cation (—$N(R^8)_3^+$), or N-substituted pyridyl cation [—$C_5H_4N(R^9)^+$];

R' and R" are identical or different, independently selected from $C_{1-6}$ alkyl, $C_{1-6}$ alkenyl, $C_{1-6}$ alkynyl, $C_{6-12}$ aryl, and 6- to 20-membered heteroaryl, which are unsubstituted or optionally substituted by 1-5 substituents of $C_{1-6}$ alkyl, $C_{1-6}$ alkenyl, $C_{1-6}$ alkynyl, aryl, halogen, trihalomethyl(—$CX_3$, X=F, Cl, Br), —$NO_2$, —CN, —$OR^3$, —$N(R^4)_2$, —CO—$R^5$, —$SO_3H$, —$S(=O)_2R^6$, —$S(=O)R^6$, —$P(=O)(R^7)_2$, tertiary amine cation (—$N(R^8)_3^+$), or N-substituted pyridyl cation [—$C_5H_4N(R^9)^+$];

wherein $R^3$ is alkyl, aryl, or heteroaryl; $R^4$ is identical or different, independently selected from H, alkyl, aryl, or heteroaryl; $R^5$ is H, —OH, alky, aryl, or heteroaryl; $R^6$, $R^7$, $R^8$ and $R^9$ are alkyl, aryl, or heteroaryl.

3. The complex according to claim 1, wherein said $Pt_2M$ heterotrinuclear metal-organic alkynyl complex is

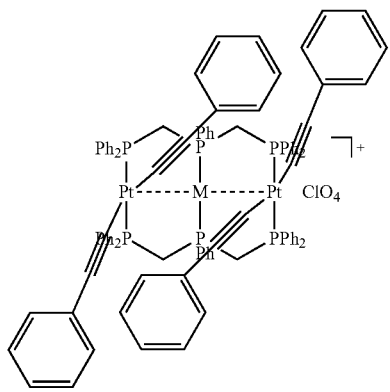

wherein M is Au(I), Ag(I), or Cu(I), or

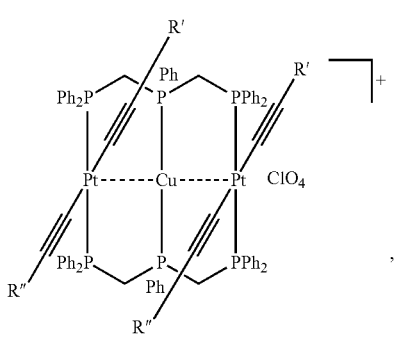

wherein R' and R" are identical and are

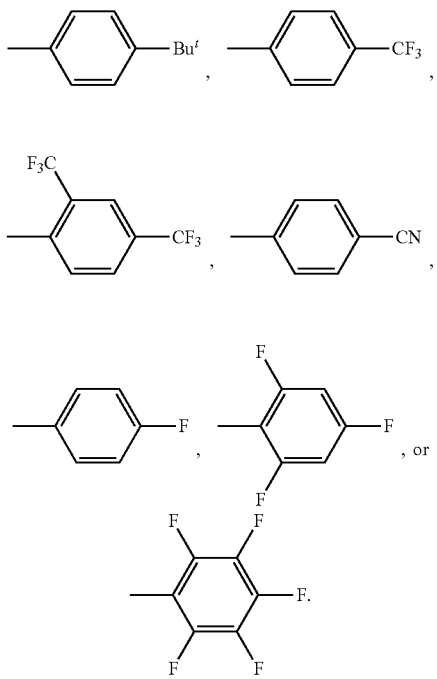

4. A preparation method of the complex according to claim 1, comprising:

1) reacting bis((diphenylphosphino)methyl)(phenyl)phosphine (dpmp) and a M-solvent complex in a first solvent to obtain an intermediate;

2) reacting said intermediate obtained in step 1) with $Pt(PPh_3)_2(C\equiv CR')(C\equiv CR")$ in a second solvent to obtain said complex of formula (I), wherein said $PPh_3$ is triphenylphosphine.

5. The preparation method according to claim 4, wherein said M-solvent complex is $[Au(tht)_2]_m(A^{m-})$, $[Ag(tht)]_m(A^{m-})$, or $[Cu(MeCN)_4]_m(A^{m-})$, wherein tht is tetrahydrothiophene, and MeCN is acetonitrile.

6. The preparation method according to claim 4, wherein said second solvent is halogenated hydrocarbon.

7. The preparation method according to claim 4, wherein the molar ratio of dpmp: Au(I), Ag(I) or Cu(I) ion: $Pt(PPh_3)_2(C\equiv CR')(C\equiv CR")$ is 2-3.0:1-1.5:2-3.0.

8. A display comprising a photochromic material of the complex of formula (I) according to claim 1.

9. An lighting apparatus comprising a photochromic material of the complex of formula (I) according to claim 1.

10. A sensor comprising a photochromic material of the complex of formula (I) according to claim 1.

11. A biomarker comprising a photochromic material the complex of formula (I) according to claim 1.

* * * * *